No. 753,426. PATENTED MAR. 1, 1904.
H. A. PALMER.
VEHICLE WHEEL TIRE.
APPLICATION FILED NOV. 13, 1903.
NO MODEL.
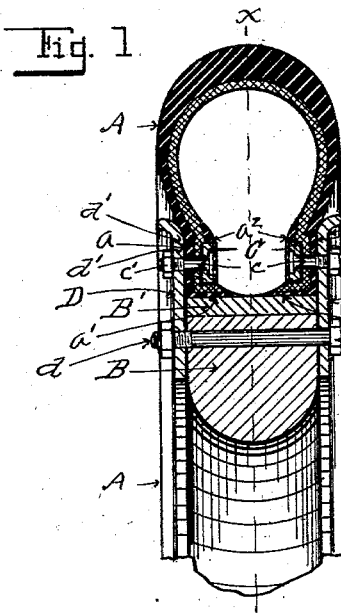
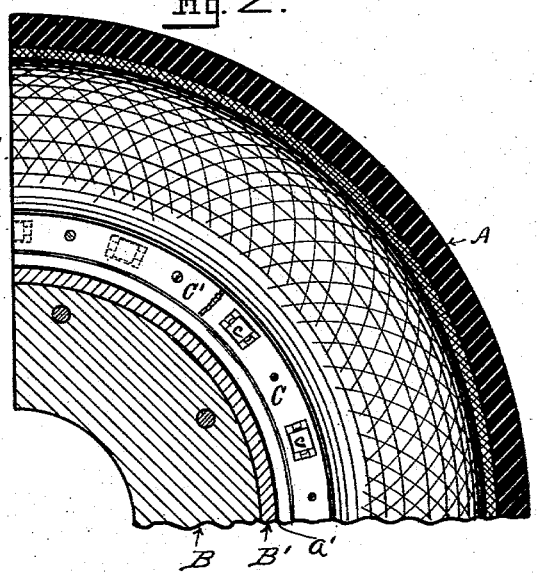
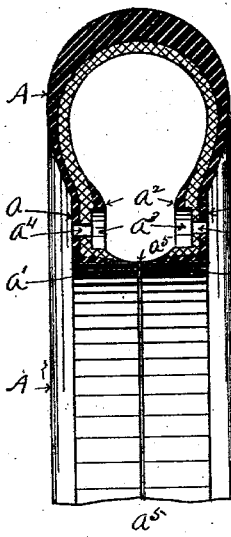
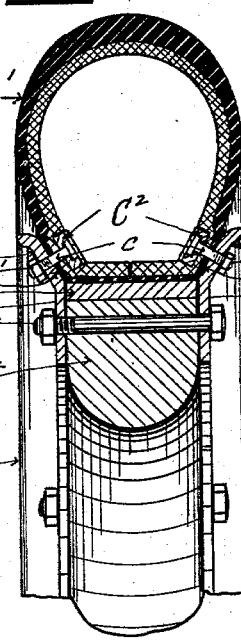
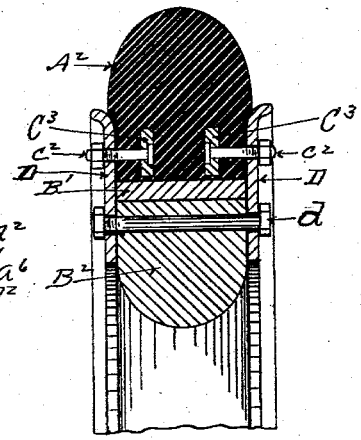
Witnesses.
Florence Stockert.
G. J. Mead
Inventor.
Harry A. Palmer
By J.C. & H.M. Sturgeon
Attys.

No. 753,426.

Patented March 1, 1904.

UNITED STATES PATENT OFFICE.

HARRY A. PALMER, OF ERIE, PENNSYLVANIA.

VEHICLE-WHEEL TIRE.

SPECIFICATION forming part of Letters Patent No. 753,426, dated March 1, 1904.

Application filed November 13, 1903. Serial No. 181,074. (No model.)

*To all whom it may concern:*

Be it known that I, HARRY A. PALMER, a citizen of the United States, residing at Erie, in the county of Erie and State of Pennsylvania, have invented certain new and useful Improvements in Vehicle-Wheel Tires; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in vehicle-wheel tires, the object thereof being to provide a new and improved means for securing a pneumatic-tire sheath or casing or a solid resilient tire in position on the wheel-rim.

The features of my invention are hereinafter fully set forth and explained, and illustrated in the accompanying drawings, in which—

Figure 1 shows a transverse section of a tire-sheath and wheel-rim embodying my invention. Fig. 2 is a central longitudinal section of the same on the line $xx$ in Fig. 1. Fig. 3 shows a transverse section of a tire-sheath constructed according to my invention. Fig. 4 shows a transverse section of a segment of a tire-sheath and wheel-rim embodying a modified form of my invention. Fig. 5 shows a transverse section of a segment of a solid resilient tire and a wheel-rim embodying my invention.

In Figs. 1, 2, 3, and 4 I have shown pneumatic-tire sheaths adapted to receive and retain an inner air-tube (not shown) of the construction ordinarily used in double-tube pneumatic tires of this character.

In the drawings, A designates the casing or sheath, composed of the usual outer resilient covering and an inner layer of fabric to reinforce and sufficiently strengthen the casing to resist the pressure of the air when the inner tube is placed therein and inflated for use.

B designates the rim or felly of a wheel, and B' the metal tire thereon.

The tire sheath or casing A, I make in the usual manner in the form of an annular hollow ring having annular flat faces $a$ (see Figs. 1, 2, and 3) on the sides thereof and a flat inner annular face or surface $a'$, adapted to fit and rest upon the metal tire B' of the wheel. The inner annular cavity of the sheath A is formed with faces $a^2$ opposite the outside flat faces $a'$, and in these inner faces $a^2$ I preferably mold annular grooves or recesses $a^3$ and bolt-holes $a^4$ for the purpose hereinafter set forth. (See Fig. 3.) The flat base $a'$ of the tire-sheath is also constructed with an annular opening or slit $a^5$, which extends entirely around the inner face or base of the tire-sheath A, through which opening access may be had to the annular cavity in the sheath A for the purpose of removing the core upon which the sheath may be molded and through which an inner tube may be inserted into and removed from the sheath when desired.

In the annular grooves or recesses $a^3$ I place metal rings C, and through bolt-holes in said rings I place bolts $c$, having, preferably, square heads, which heads are countersunk into the surface of said rings C. These countersinks and bolt-holes in said rings are preferably made somewhat elongated, as shown in Fig. 2, in order to permit of slight circumferential movement of the bolts $c$ therein. Over these bolts $c$ I preferably place a shield, which I preferably make in the form of a thin metal ring C', secured to the ring C; but it may be made of canvas or other suitable material secured to the inside of the sheath A in any convenient manner. It will be seen, however, that if metal shields C' are used they will serve the double purpose of holding the bolts $c$ from being pushed back into the cavity in the sheath when the rings C are placed in the recesses $a^3$ while other members of my improved fastening hereinafter described are being put in place, and also as a shield to prevent undue wear upon the inner tube (not shown) when within the annular cavity of the sheath and in use.

To each side of the wheel-rim I secure, by means of bolts $d$, metal flange-rings D D, of sufficient diameter and width to give a secure facing upon the wheel-rim B B' and so that the parts $d'$ $d'$ thereof form a circumferential channel around the wheel-rim, as shown in Figs. 1 and 4, deep enough to receive the flat surfaces $a$ on the tire-sheath A, said metal flange-rings D D having holes therethrough coinciding with the bolt-holes $a^4$ in the tire-sheath and adapted to receive the bolts $c$, secured in the clamp-rings C and extending out through said holes $a^4$ (see Fig. 3) in the sheath A far enough to pass through the flange-rings D and receive nuts $c'$ upon their screw-threaded ends or be otherwise fastened. It will readily be seen that by means of this construction the tire-sheath A is securely clamped in place within the peripheral channel formed by the flange-rings D D between the clamp-rings C C and the flange-rings D D, forming said channel, and thus securely held in the channel against the strain of inflation of the inner tube within the sheath, yet easily removable from the wheel-rim when desired.

In Fig. 4 I show an alternative construction in which the flange-rings $D'$ $D'$ are so constructed that the portions $d^2$ $d^2$ thereof flare outwardly at an angle to a line parallel with the side faces of the wheel-rim, and the tire-sheath is constructed with its flat outer faces $a^6$ $a^6$ adjacent to its inner face to correspond with and fit into the flaring channel formed by the extensions $d^2$ $d^2$ of the flange-rings $D'$ $D'$. The clamp-rings $C^2$ $C^2$ are also flared or dished correspondingly, so that their outer faces when in place are substantially parallel to the flange extensions $d^2$ $d^2$ of the flange-rings $D'$ $D'$, to which they are bolted, as hereinbefore described. In this construction I preferably show the base or inner annular face of the sheath of equal thickness entirely across the same and adapted to give perfect protection to an inner tube placed therein. In all other respects this construction is the same as that shown in Figs. 1 and 2.

In Fig. 5 I show a modification of my invention, in which the clamp-rings $C^3$ $C^3$ and bolts $c^2$ are embedded and vulcanized in a solid tire $A^2$, adapted to be secured thereby in a channel on a wheel-rim constructed of removable rings secured to a wheel-rim, as herein shown and described in Figs. 1 and 2.

Having thus shown and described convenient constructions of my invention, which will enable others to construct and utilize the same, I do not desire to confine myself to the exact constructions herein shown and described, as

What I claim as new, and desire to secure by Letters Patent of the United States, is—

1. The combination in a vehicle-wheel tire, of radial clamp-rings within the tire, and bolts extending therefrom adapted to pass through the sides of the tire and through the radial portions of the channel rings or flanges on a vehicle-wheel rim, substantially as set forth.

2. The combination in a pneumatic vehicle-wheel tire, of a tire-sheath provided with a slit in its inner face, and adapted to inclose an inner air-tube, radial clamp-rings on the inner faces of the sides of the sheath near the base thereof, and bolts passing through said radial clamp-rings, through the sides of the tire-sheath and through the radial portions of the channel-rings on the sides of a vehicle-wheel, substantially as set forth.

3. The combination in a pneumatic vehicle-tire, of a tire-sheath provided with a slit in its inner face, adapted to inclose an inner air-tube, and having recesses in the inner faces of the sheath near the base thereof, radial clamp-rings in said recesses, and bolts passing through said clamp-rings, and the sides of the tire-sheath and adapted to pass through and be secured in channel-rings on the sides of a vehicle-wheel substantially as set forth.

4. The combination in a pneumatic vehicle-wheel tire of a tire-sheath, provided with a slit on its inner face and adapted to inclose an inner air-tube, and having recesses in the inner faces of the sheath near the base thereof, clamping-rings in said recesses, bolts passing through said clamp-rings and the sides of the tire-sheath, adapted to pass through and be secured in the channel-rings on the sides of the vehicle-wheel, and shields on the inside of the sheath, covering said clamping-rings, substantially as set forth.

5. The combination in a vehicle-wheel, of a wheel-rim, a metal tire thereon, flange-rings secured to the sides of the wheel-rim so as to form a peripheral channel thereon, a pneumatic-tire sheath provided with a slit on its inner face, and adapted to inclose an inner tube, and fit into the channel on the wheel-rim, clamping-rings on the inner faces of the sheath opposite the sides of the channel on the wheel-rim, and bolts passing through said clamp-rings, the sides of the sheath and said flange-rings whereby the sides of the base of the tire-sheath are clamped between said clamp-rings and said flange-rings, substantially as set forth.

In testimony whereof I affix my signature in presence of two witnesses.

HARRY A. PALMER.

Witnesses:
 H. M. STURGEON,
 G. J. MEAD.